US008539552B1

(12) United States Patent
Grabelsky et al.

(10) Patent No.: US 8,539,552 B1
(45) Date of Patent: Sep. 17, 2013

(54) SYSTEM AND METHOD FOR NETWORK BASED POLICY ENFORCEMENT OF INTELLIGENT-CLIENT FEATURES

(75) Inventors: David Grabelsky, Skokie, IL (US); Anoop Tripathi, Lake Zurich, IL (US); Michael Homeier, Lake Forest, IL (US); Guanglu Wang, Buffalo Grove, IL (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1045 days.

(21) Appl. No.: 10/671,375

(22) Filed: Sep. 25, 2003

(51) Int. Cl.
H04L 29/06 (2006.01)

(52) U.S. Cl.
USPC .................................. 726/4; 726/21; 709/225

(58) Field of Classification Search
USPC ................ 713/166; 455/432.3, 433; 726/26; 379/201.01; 370/338, 332
See application file for complete search history.

(56) References Cited

U.S. PATENT DOCUMENTS

| 5,809,230 | A * | 9/1998 | Pereira .............................. 726/35 |
| 6,446,206 | B1 * | 9/2002 | Feldbaum ...................... 713/175 |
| 6,625,141 | B1 * | 9/2003 | Glitho et al. ................... 370/352 |
| 6,667,971 | B1 * | 12/2003 | Modarressi et al. ........... 370/352 |
| 6,678,735 | B1 * | 1/2004 | Orton et al. ..................... 709/230 |
| 6,785,728 | B1 * | 8/2004 | Schneider et al. ............. 709/229 |
| 7,136,373 | B2 * | 11/2006 | Ma ................................. 370/352 |
| 7,207,057 | B1 * | 4/2007 | Rowe ............................. 725/144 |
| 2001/0024436 | A1 * | 9/2001 | Barraclough et al. ......... 370/352 |
| 2002/0075844 | A1 * | 6/2002 | Hagen ............................ 370/351 |
| 2002/0116643 | A1 * | 8/2002 | Raanan et al. ................. 713/201 |
| 2002/0124112 | A1 * | 9/2002 | Tso ................................ 709/246 |
| 2003/0081607 | A1 * | 5/2003 | Kavanagh ...................... 370/392 |
| 2003/0093563 | A1 * | 5/2003 | Young et al. .................. 709/245 |
| 2003/0177363 | A1 * | 9/2003 | Yokota et al. ................. 713/176 |
| 2004/0029564 | A1 * | 2/2004 | Hodge ........................... 455/411 |
| 2004/0057188 | A1 * | 3/2004 | Phillips et al. ................ 361/119 |
| 2004/0193906 | A1 * | 9/2004 | Dar et al. ....................... 713/200 |

OTHER PUBLICATIONS

Request for Comments: 3303, "Middlebox communication architecture and framework," *MIDCOM Architecture and Framework*, p. 1-34 Aug. 2002.
U.S. Appl. No. 10/243,642, Architecture and Method for Controlling Features and Services in Packet-Based Networks, p. 1-48, Sep. 2002.

* cited by examiner

*Primary Examiner* — Gilberto Barron, Jr.
*Assistant Examiner* — Roderick Tolentino (57) ABSTRACT

A system and method for network based policy enforcement of intelligent-client features is provided. An operator of an IP telephony and/or IP multimedia network may enforce authorization or privileges of intelligent end-user clients to utilize or invoke services in the network. A network policy enforcement point is maintained in the network by elements that are under control of the network operator. The network policy enforcement point controls access to, and invocation of, features and services that may otherwise be delivered to subscribers without the knowledge or authorization of the network. The network policy enforcement point receives messages, associates the message with a known service, makes a determination as to whether a beneficiary of the service is authorized to invoke the service, and then filters the messages based on the determination.

25 Claims, 7 Drawing Sheets

SYSTEM AND METHOD FOR NETWORK BASED POLICY ENFORCEMENT OF INTELLIGENT-CLIENT FEATURES

FIELD OF INVENTION

The present invention relates to policy enforcement of network services and, more particularly, to a system and method for network based policy enforcement of intelligent-client features.

BACKGROUND

The emergence of Internet Protocol (IP) telephony and IP multimedia networks poses challenges to carriers and service providers, however, it also presents new and expanded business opportunities. The increasing use of IP telephony has spurred development and introduction of numerous telephony services. The use of IP telephony protocols as an interface may assure that a "customer" and a "server" can rely on a common and widely used method for exchanging information. The protocols developed for IP-based services, features, and media transport enable migration of signaling and call-control functionality to intelligent end-user clients. Examples of such protocols include H.323 and the Session Initiation Protocol (SIP). To the extent that telephony services and features can be implemented in intelligent clients, the carriers and service provider network's responsibilities include little more than providing data pipes.

In practice, however, many next-generation services still depend upon network-based servers and support, so network providers are probably in no danger of loosing their ability to sell services. But the trend toward intelligent, IP-based clients is a new dimension in the space of creation and delivery of telephony and media services. At best, carriers, service providers, and device manufacturers may have to work together to ensure interoperability. At worst, carriers and service providers may need to deal with unauthorized delivery of services by intelligent clients in their networks. Either way, maintaining relevance as providers of services, and not just transport of the services, is no longer a given for network providers in a world shared with intelligent clients.

Therefore, if carriers and service providers are to maintain their ability to generate revenue for services offered or supported in their networks, then the service providers' ability to enforce the authorization of service usage is important. This is particularly important in next-generation IP telephony and IP multimedia networks, where many basic and advanced services may be signaled, controlled, and/or delivered by intelligent end-user clients that are not owned or controlled by the network providers, thereby enabling potential bypassing by the end user of service agreements or other subscription accounting mechanisms.

SUMMARY

In an exemplary embodiment, a method for controlling services in packet-based networks is provided. The method includes receiving signaling messages within a communication path between a sender and a recipient device. The signaling messages include an indication of a type of service which the messages are intended to invoke. The method further includes making a determination of whether the sender or the recipient of the messages is authorized to invoke the type of service, and filtering the signaling messages based on the determination so as to pass to the intended recipient device signaling messages having an indication of services that are authorized.

In another respect, the exemplary method for controlling services in packet-based networks includes receiving a message, which is configured according to a protocol, and associating the message with a known service that is defined within the protocol. This method includes requesting a user profile of a user associated with the message that specifies which services the user is authorized to use. This method also includes determining from the user profile whether the user is authorized to invoke the known service, and filtering the message based on whether the user is authorized to invoke the known service.

In still another respect, the exemplary embodiment may take the form of a system that includes a border element and a proxy server. The border element is in a communications path of session initiation protocol (SIP) signaling messages between end devices, and may filter the SIP signaling messages based on authorized services of the end devices. The SIP signaling messages include an indication of services. The proxy server may receive a request from the border element for a user profile of at least one of the end devices, and in response, send the user profile to the at least one of the end devices. The user profile specifies which services the at least one end device is authorized to use.

These as well as other features and advantages will become apparent to those of ordinary skill in the art by reading the following detailed description, with appropriate reference to the accompanying drawings.

BRIEF DESCRIPTION OF FIGURES

Exemplary embodiments of the present invention are described with reference to the following drawings, in which.

DETAILED DESCRIPTION OF EXEMPLARY EMBODIMENTS

In packet-based networks, intelligent end-user clients with little or no support and/or knowledge of the network can deliver many features and services. For networks to retain control over the features and services used by subscribers that use intelligent end-user clients, the networks need to be able to recognize signaling and call control messages and transactions that implement these features and services within the network. This is particularly important in next-generation IP telephony and IP multimedia networks where many basic and advanced services may be signaled, controlled, and/or delivered by intelligent end-user clients which are not owned or controlled by the network or service providers, thereby enabling the potential bypassing by the end user of service agreements or other subscription accounting mechanisms.

One approach to policing network service usage is to extend signaling and control protocols, such as the Session Initiation Protocol (SIP), to support informing the intelligent client as to which services are authorized. This approach is described in U.S. patent application Ser. No. 10/243,642, filed on Sep. 10, 2002, and entitled "Architecture and Method for Controlling Features and Services in Packet-Based Networks," which is entirely incorporated by reference herein as if fully set forth in this description. This approach relies on the ability of the client to support required protocol extensions, and to function as the policy enforcement point on behalf of the network.

In the exemplary embodiment, the present invention describes a system and method for using network-based policy enforcement to control access to, and invocation of, features and services which may otherwise be delivered to subscribers without the knowledge or authorization of the network. An operator of an IP telephony and/or IP multimedia network may enforce authorization or privileges of intelligent end-user clients to utilize or invoke services in the network, even when the capabilities for the requisite signaling and call control of those services may reside in the end-user clients themselves.

In the exemplary embodiment, a policy enforcement point is maintained in the network by elements that are under control of the network operator. This approach lessens and/or eliminates a need for the network operator to police the selection of client devices, and at the same time, allows end users to install nearly any suitable device of their choosing.

Network Architecture

Figure 1:
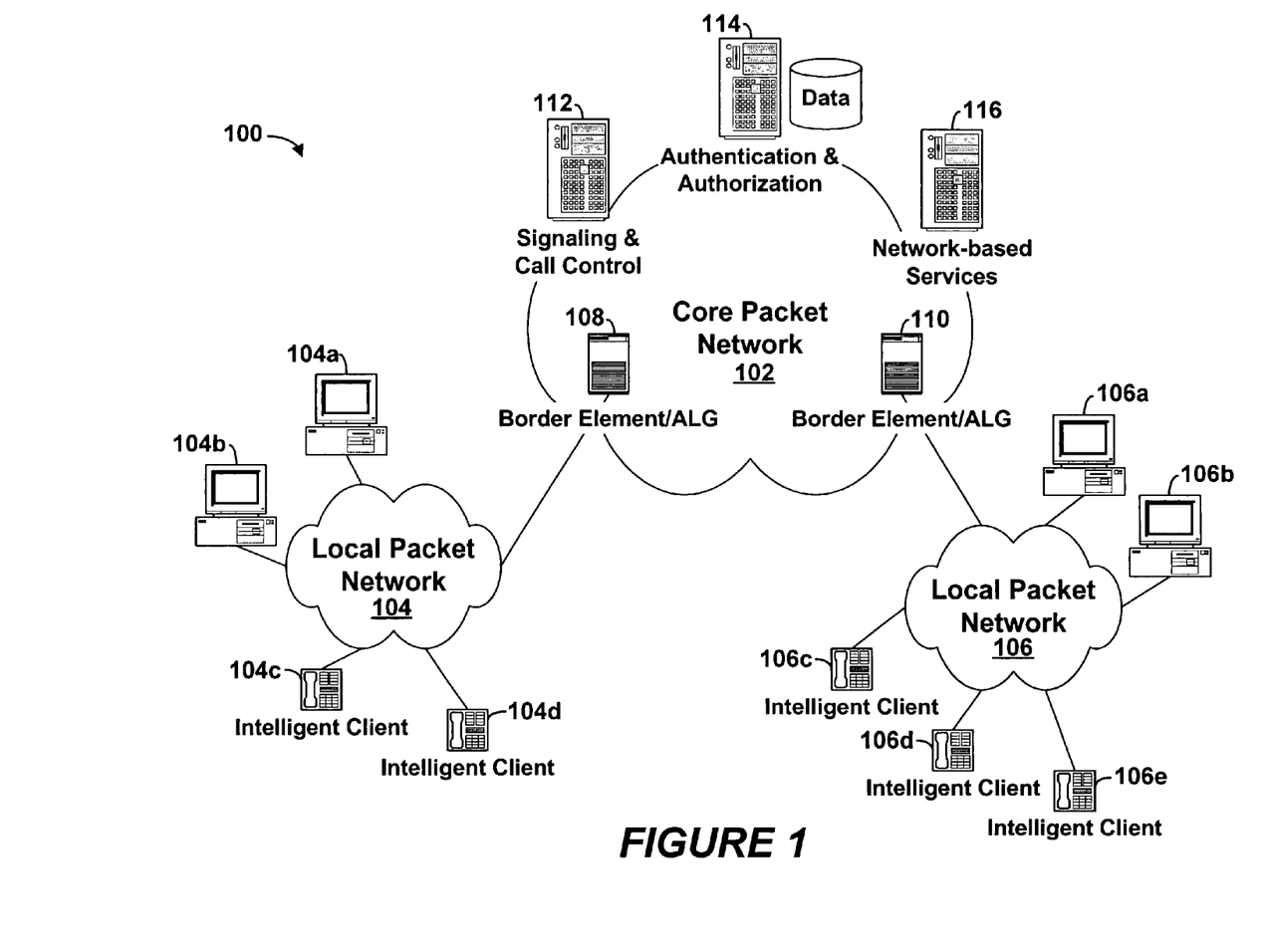
FIG. 1 is a block diagram illustrating one embodiment of a network architecture for support of packet-based telephony and multimedia sessions and services according to the present invention.

Referring now to the figures, FIG. 1 is a block diagram illustrating one embodiment of a network 100. It should be understood that this and other arrangements described herein are set forth for purposes of example only, and other arrangements and elements can be used instead and some elements may be omitted altogether. Further, many of the elements described herein are functional entities that may be implemented as hardware, firmware or software, and as discrete components or in conjunction with other components, in any suitable combination and location.

The network 100 includes functionality of a packet network architecture for support of packet-based telephony and multimedia sessions and services. The network 100 includes a core packet network 102, and two local packet networks 104 and 106, as well as intelligent end-user clients 104a-d and 106a-e associated with the local packet networks 104 and 106. Access to the core packet network 102 is available through border elements 108 and 110, such as a firewall or application layer gateway (ALG) device. Maintaining the border elements 108 and 110 within the core packet network 102 may protect the core packet network 102 from errant behavior of extra-network elements, whether malicious or inadvertent. Note that local packet networks 104 and 106 may likewise employ border elements for security purposes.

The core packet network 102 includes a signaling and call control server 112, an authentication and authorization sever 114, and a network-based services server 116. The signaling and call control server 112 intercepts call set-up messages sent between the end-user clients, e.g., intelligent client 104c, and the core packet network 102 and checks the authentication and authorization server 114 to determine what services the client may invoke. In turn, the signaling and call control server 112 may contact the network-based services server 116 to invoke any services requested by the client, if the client is authorized to invoke the service.

The local packet networks 104 and 106 may be local area networks (LANs). The LAN provides local connectivity for end-user clients, while the core packet network 102 provides access to global packet telephony services, as well as possibly to a public packet data network. The core packet network 102 connects the local packet networks 104 and 106 to other local networks, as well as to the public switched telephone network (PSTN) via media gateways, for example.

The local packet networks 104 and 106 may be maintained within private or restricted address spaces. That is, addresses of devices within or residing within a given local packet network may not be visible or valid to entities in the core packet network 102, or in other local networks. Rather, a mapping of addresses is used across the boundaries between the core packet network 102 and the local packet networks 104 and 106. In this case, the border elements 108 and 110 in the core packet network 102 provide the mapping functionality, translating between addresses on the core packet network 102 side and the local packet network side. In an IP network, for example, this could be supported with Network Address Translation (NAT). This may also be supported with Realm Specific Internet Protocol (as described in RFC 3104-3105). Alternatively, this address-mapping function may be accomplished on the local network side, but the core packet network 102 may still provide a subset of core network addresses that may be used in the mapping, i.e., access to the core packet network 102 first passes through some sort of core-network border element. Isolating the address space of the local packet networks 104 and 106 from the core packet network 102 introduces a stronger degree of control over access to services and features in the core packet network 102, because clients' true addresses are hidden from entities outside the local packet networks 104 and 106, which prevents surreptitious communications across the boundary between local and core networks.

If address mapping is used at the border between the core packet network 102 and the local packet networks 104 and 106, then end-user devices can access services in the core packet network 102 with explicit awareness of some element or elements within the core packet network 102.

Figure 2:
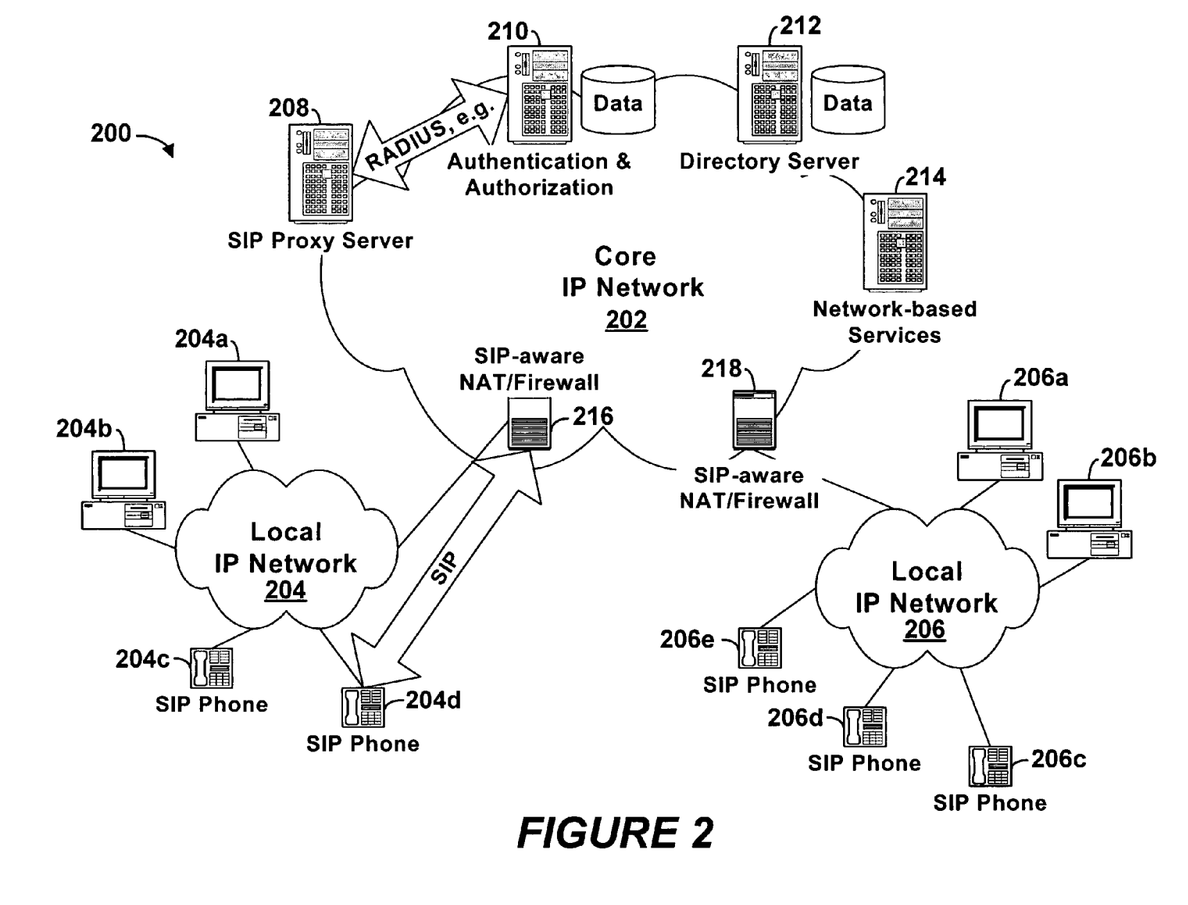
FIG. 2 is a block diagram illustrating another embodiment of a network architecture for support of packet-based telephony and multimedia sessions and services according to the present invention.

FIG. 2 illustrates a specific example of a network 200, similar to that illustrated in FIG. 1, in which the packet networks are IP networks. For this example, the SIP signaling and call control protocol is implemented. However, other signaling protocols, such as H-323, Media Gateway Control Protocol (MGCP), Media Gateway Control (MEGACO), and other standard or proprietary techniques may alternatively be used. A brief explanation of SIP is given below.

SIP is described in Handley, et al., "SIP: Session Initiation Protocol," IETF RFC 2543, March 1999, which is entirely incorporated by reference herein, as if fully set forth in this description. SIP is also described in Rosenberg et al., "SIP: Session Initiation Protocol," IETF RFC 3261, June 2002, the contents of which are entirely incorporated herein by reference, as if fully set forth in this description. SIP describes how to set up Internet telephone calls, videoconferences, and other multimedia connections. SIP can establish two-party sessions (ordinary telephone calls), multiparty sessions (where everyone can hear and speak), and multicast sessions (one sender, many receivers). The sessions may contain audio, video, or data. SIP handles call setup, call management, and call termination. Other protocols, such as real time protocol (RTP)

are used for data transport. SIP is an application layer protocol and can run over the user datagram protocol (UDP) or the transport control protocol (TCP), for example.

SIP supports a variety of services, including locating the callee, determining the callee's capabilities, and handling the mechanics of call setup and termination, for example. SIP defines telephone numbers as uniform resource locators (URLs), so that Web pages can contain them, allowing a click on a link to initiate a telephone call (similar to the mailto function that allows a click on a link to initiate a program to send an e-mail message). For example, John_Doe@3Com.com may represent a user named John at the host specified by the domain name system (DNS) of 3Com. SIP URLs may also contain other addresses or actual telephone numbers.

The SIP protocol is a text-based protocol in which one party sends a message in American standard code for information interchange (ASCII) text consisting of a method name on the first line, followed by additional lines containing headers for passing parameters. Many of the headers are taken from multipurpose Internet mail extensions (MIME) to allow SIP to interwork with existing Internet applications.

As an example, consider the following exemplary text encoded message below in Table 1.

TABLE 1

INVITE sip:user@biloxi.com SIP/2.0
Via: SLP/2.0/UDP pc33.atlanta.com;branch=z9hG4bK776asdhds
Max-Forwards: 70
To: User <sip:user@biloxi.com>
From: Sender <sip:sender@atlanta.com>;tag=1928301774
Call-ID: a84b4c76e66710@pc33.atlanta.com
CSeq: 314159 INVITE
Contact: <sip:sender@pc33.atlanta.com>
Content-Type: application/sdp
Content-Length: 142

This text-encoded message is a SIP INVITE message. The first line of this text-encoded message contains the method name (e.g., INVITE). The lines that follow are a list of header fields. For example, the fields Via (describing the address at which the user is expecting to receive responses), To (contains a display name or SIP request-URI towards which the request was originally directed), From (contains a display name and a SIP request-URI that indicate the originator of the request), Call-ID (contains a globally unique identifier for this call), CSeq (a traditional sequence number), and Contact (contains a SIP request-URI that represents a direct route to contact the sender) are header fields. In addition, the From header also has a tag parameter containing a random string (e.g., 1928301774) that is used for identification purposes.

Other example methods are provided below in Table 2.

TABLE 2

| METHOD | DESCRIPTION |
| --- | --- |
| INVITE | Request initiation of a session |
| ACK | Confirm that a session has been initiated |
| BYE | Request termination of a session |
| OPTIONS | Query a host about its capabilities |
| CANCEL | Cancel a pending request |
| REGISTER | Inform a redirection server about the user's current location |
| NOTIFY | Indicates the status of a request |
| REFER | Requests that the party sending the REFER be notified of the outcome of the referenced request |

To establish a call session, a caller sends an INVITE message to a callee by way of a proxy server. The transport protocol for the transmission may be TCP or UDP, for example. In both cases, the headers on the second and subsequent lines of INVITE message describe the structure of the message body, which contains the caller's capabilities, media types, and formats. The INVITE message also contains a user identifier to identify the callee, a caller user identifier to identify the caller, and a session description that informs the called party what type of media the caller can accept and where the caller wishes the media data to be sent. User identifiers in SIP requests are known as SIP addresses. SIP addresses are referred to as SIP Universal Resource Indicators (SIP request-URIs), which are of the form sip: user@host.domain. Other addressing conventions may also be used.

The proxy server will read the INVITE message and may use a location service locally or remotely located to itself to determine the location of the callee, as identified in the INVITE message. The proxy server determines the location of the callee by matching the SIP request-URI in the INVITE message to one within a location database, which may be within another proxy server. The INVITE request is then forwarded to the callee. Upon receiving the INVITE request, the callee may transmit a response message.

The response message may be a reply code. A reply code may be a three-digit number with a classification as defined below in Table 3.

TABLE 3

| CODE | MEANING | EXAMPLES |
| --- | --- | --- |
| 1xx | Information | 100 = server agrees to handle client's request |
| 2xx | Success | 200 = request succeeded |
| 3xx | Redirection | 301 = page moved |
| 4xx | Client Error | 403 = forbidden page |
| 5xx | Server Error | 500 = internal server error |

For example, if the callee accepts the call, the callee responds with a 200 OK message. Following the reply code line, the callee also may supply information about the callee's capabilities, media types, and formats.

Referring back to FIG. 2, the network 200 includes a core IP network 202, and local IP networks 204 and 206. In this case, end-user clients are SIP user agents, such as SIP user agent 204a-b and 206a-b, and SIP phones, such as SIP phone 204c-d and 206c-e. The core IP network 202 includes a SIP Proxy server 208, an authentication/authorization server 210, a directory server 212, and a network-based services server 214. Border elements in the core IP network 202 are NAT firewalls 216 and 218, which incorporate functionality specific to SIP. Such devices are commonly referred to as SIP-aware firewalls, as illustrated. The NAT firewalls 216 and 218 make it possible, for example, for a SIP client with only a local address within the local area network to initiate and receive SIP-based calls to and from SIP endpoints in the core IP network 202, or other local networks connected (directly or indirectly) to the core IP network 202.

In order for a SIP phone, e.g., 204c, to establish connectivity beyond its local IP network 204, its user registers with the SIP proxy server 208 in the core IP network 202. The registration process will typically include some sort of verification that authenticates the user and authorizes use of a set of services. This authentication usually involves communications between the SIP proxy server 208 and the authentication and authorization server 210 via an additional protocol. For example, Remote Authentication Dial In User Service (RADIUS) might be used for this purpose. Assuming the user is successfully authenticated, authorization for use of services could be determined according to a user profile stored in the authentication and authorization server 210. The user profile might list services and features to which the user has subscribed, e.g., basic calls, call waiting, call forwarding, etc. Once registration is complete, the user may invoke services within the core IP network 202. Note that the user could be a specific person, group, or generic identity (e.g., "cafeteria phone").

While lists of authorized services and features may be stored in the user profile, it is possible for many of the features themselves to be fully or partially realized directly within the SIP phone 204c. Thus, a user could decline to subscribe to a certain service in the core IP network 202, but still obtain that service using the implementation on the SIP phone 204c. Assuming that a carrier or service provider of the network 200 normally charges for that service, then this user would be acquiring it for free. As noted, one way to attempt to prevent this from happening is to extend or enhance the SIP protocol to support passing the information about the user's authorized services to the SIP phone, as described in U.S. patent application Ser. No. 10/243,642, entitled "Architecture and Method for Controlling Features and Services in Packet-Based Networks." The SEP phone would then only invoke those services for which authorization has been received, i.e., the SIP phone becomes the policy enforcement point on behalf of the core IP network 202.

Network-Based Policy Enforcement of Intelligent-Client Features

In the exemplary embodiment, an entity of the network 200 is the policy enforcement point on behalf of the core IP network 202. The entity is a core-network-based policy enforcement point that is (1) in the communications path of substantially each and every call control and signaling message between any end-user client and any call control and signaling entity of the network 202 (including, possibly, another client device); and (2) able to communicate with, and set parameters of, network elements that monitor and control media data flow across network boundaries (e.g., border elements 216 and 218). The policy enforcement point may recognize all call control and signaling messages that pass through it, and filter them according to their content, including, but not limited to, sender, intended recipient, and meaning within the particular call control and signaling protocol (e.g., message type). In addition, the policy enforcement point may control media data flow, or augment and/or assist other network elements that have this function. Such control of media data flow may include, but is not limited to, ensuring compliance of media streams with agreed-to bandwidth and other network resource usage.

The policy enforcement point may facilitate network-based enforcement of service and feature privileges on a call-by-call basis, (1) during an initial setup phase of the call or session, based upon the filtering of call control and signaling messages; and (2) once the call, session, service, or feature is allowed and/or established, based upon both filtering of subsequent call control messages, and the monitoring and enforcement of any relevant, negotiated media bandwidth and/or other network resource usage. Note that the term policy enforcement point is a reference to a logical localization of a set of tasks and functions that may actually be embodied in one or more physical devices, and/or in a distributed manner.

The network policy enforcement point may use information, if known, regarding authorized services and features of the sender, and/or information, if known, regarding authorized services and features of the intended recipient, to process each call control and signaling message according to a policy or policies prescribed by the core IP network. The filtering of call control and signaling messages constitutes policy enforcement, and for each message may result in the message being forwarded on with or without alterations, the message being discarded with or without return of an error indication message to the sender, or the message being discarded with return of an option message to the sender, for example.

For any given message for which the sender is an authorized subscriber to the core network, the sender's user profile will be known to the network and thus available to the policy enforcement entity. In this case, policy enforcement will be applied according to the sender's authorized services and features, even if the intended recipient is not a subscriber to the core network, or is a trusted endpoint within the core network. For example, the intended recipient could be a service element within the core network, or subscriber in another core network.

For any given message for which the intended recipient is an authorized subscriber to the core network, the intended recipient's user profile will be known to the network and thus be available to the policy enforcement entity. In this case, policy enforcement will be applied according to the intended recipient's authorized services and features, even if the sender is not a subscriber to the core network, or is a trusted endpoint within the core network. For example, the sender could be a service element within the core network, or a subscriber in another core network.

A policy enforcement point(s) is (are) the network entity (or entities) at which policy is set. This could be accomplished at the authentication and authorization server 210, the call control and signaling server (e.g., the SIP proxy server 208), or any other element that can communicate, directly or indirectly, with a policy enforcement point.

Enforcement of bandwidth and/or other network resource usage according to the authorized services on a given call, session, service, or feature may be accomplished by monitoring the associated media stream(s), and comparing statistics compiled with relevant parameters established during the call control and signaling phase. The actions taken on calls or sessions found to be in violation of negotiated bandwidth or other resource usage may range from dropping excess media data associated with the call or session, to terminating the call or session. The specific actions may depend upon local policy. If such actions are already encompassed within the functions of existing network entities, such as border elements (e.g., NAT firewalls 216 and 218), then the system and method of the present invention may assist these entities by supplying relevant information collected during the setup of calls and sessions.

Figure 3:
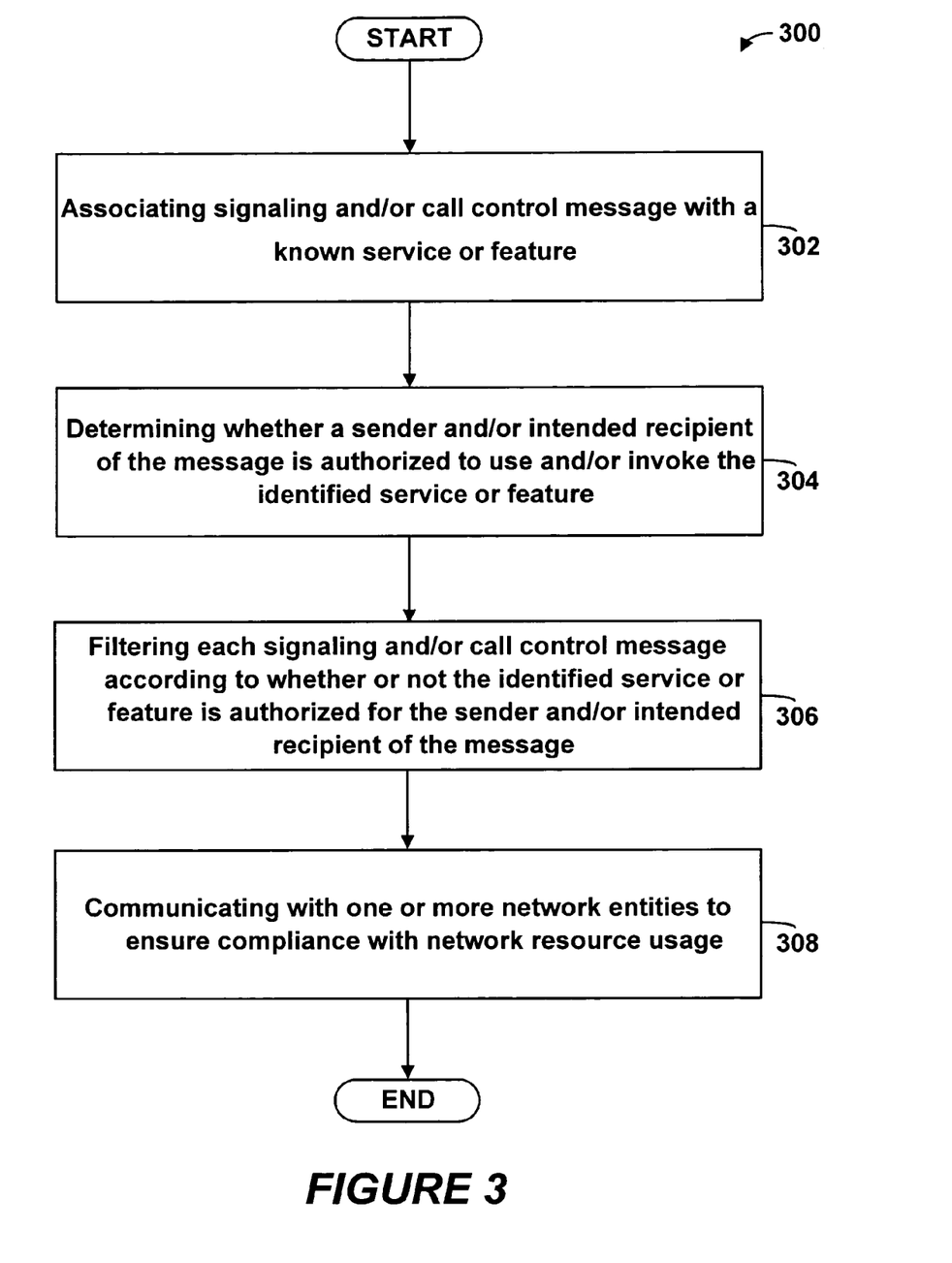
FIG. 3 is a flowchart depicting one embodiment of a method of network-based policy enforcement of intelligent client features.

FIG. 3 is a flowchart depicting one embodiment of a method 300 of network-based policy enforcement of intelligent client features. Initially, signaling and call control messages are received or intercepted by the policy enforcement point. The policy enforcement point may be a border element between a local network and a core network, for example, that intercepts all signaling messages sent in between. Each signaling and/or call control message is then associated with a known service or feature, or a call-flow segment of a known service or feature, as shown at block 302. The policy enforcement point then determines whether the sender and/or intended recipient of the message is authorized to use and/or invoke the identified service or feature, as shown at block 304. The policy enforcement point then filters each signaling and/ or call control message according to whether or not the identified service or feature is authorized for the sender and/or intended recipient of the message, as shown at block 306. The policy enforcement point may then communicate with and/or control one or more network entities responsible for monitoring and regulating media data flow across network boundaries in order to ensure compliance with the authorization of usage of services and negotiated bandwidth, as shown at block 308. Note that the step of communicating with network entities to monitor network resource usage is optional on a call-by-call basis, depending upon whether or not the call or session is allowed, and whether any associated services or features consume or depend upon media resources of the network. Each step is considered in further detail below with reference to FIGS. 4-7, which will first be described.

Figure 4:
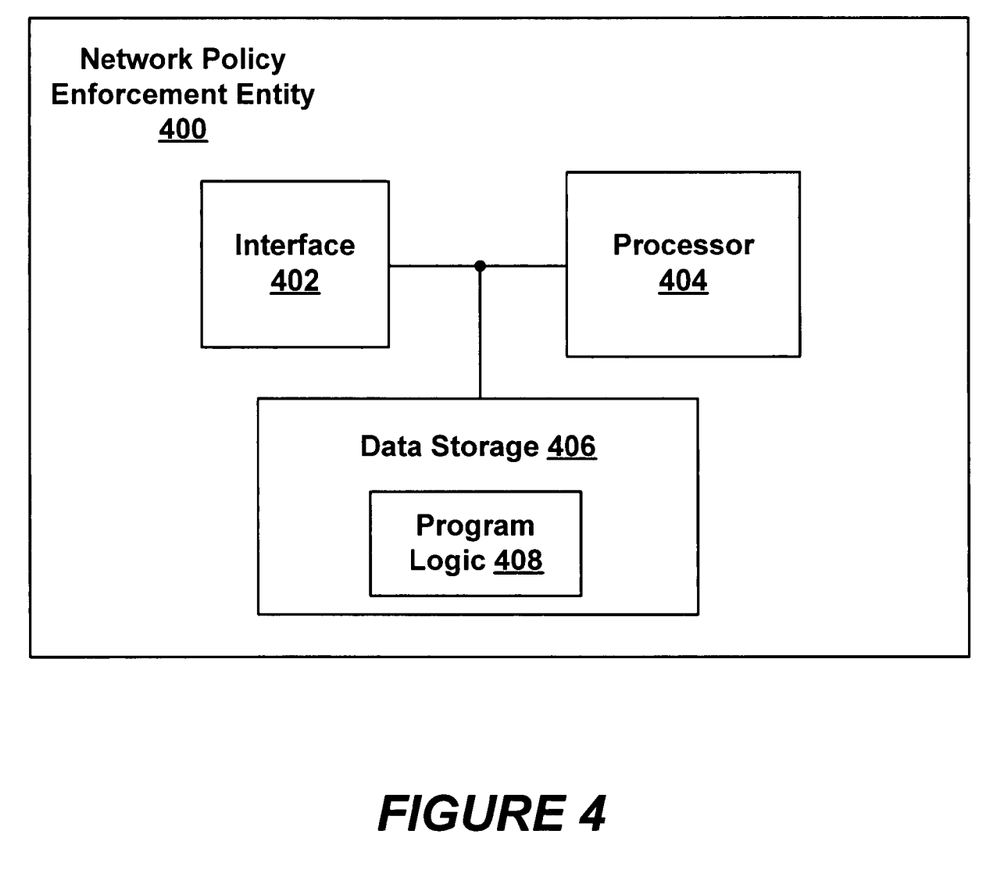
FIG. 4 illustrates one embodiment of a network policy enforcement entity that may carry out the method of FIG. 3.

FIG. 4 illustrates a network policy enforcement entity 400 that may carry out the method 300 of FIG. 3. The entity 400 includes an interface 402, a processor 404, data storage 406, and program logic 408 stored in the data storage 406. The processor 404 may comprise one or more smaller central processing units, including, for example, a programmable digital signal processing engine. The data storage 406 may include any type of storage, such as random access memory (RAM) or secondary long term storage such as read only memory (ROM), optical or magnetic disks, compact-disc read only memory (CD-ROM), or any other volatile or non-volatile storage systems.

The interface 402 receives signaling messages between two network end devices and passes the messages to the processor 404. The processor 404 executes the program logic 408 stored in the data storage 406 to filter the messages based on whether one of the network end devices is authorized to invoke services indicated within the messages.

Figure 5:
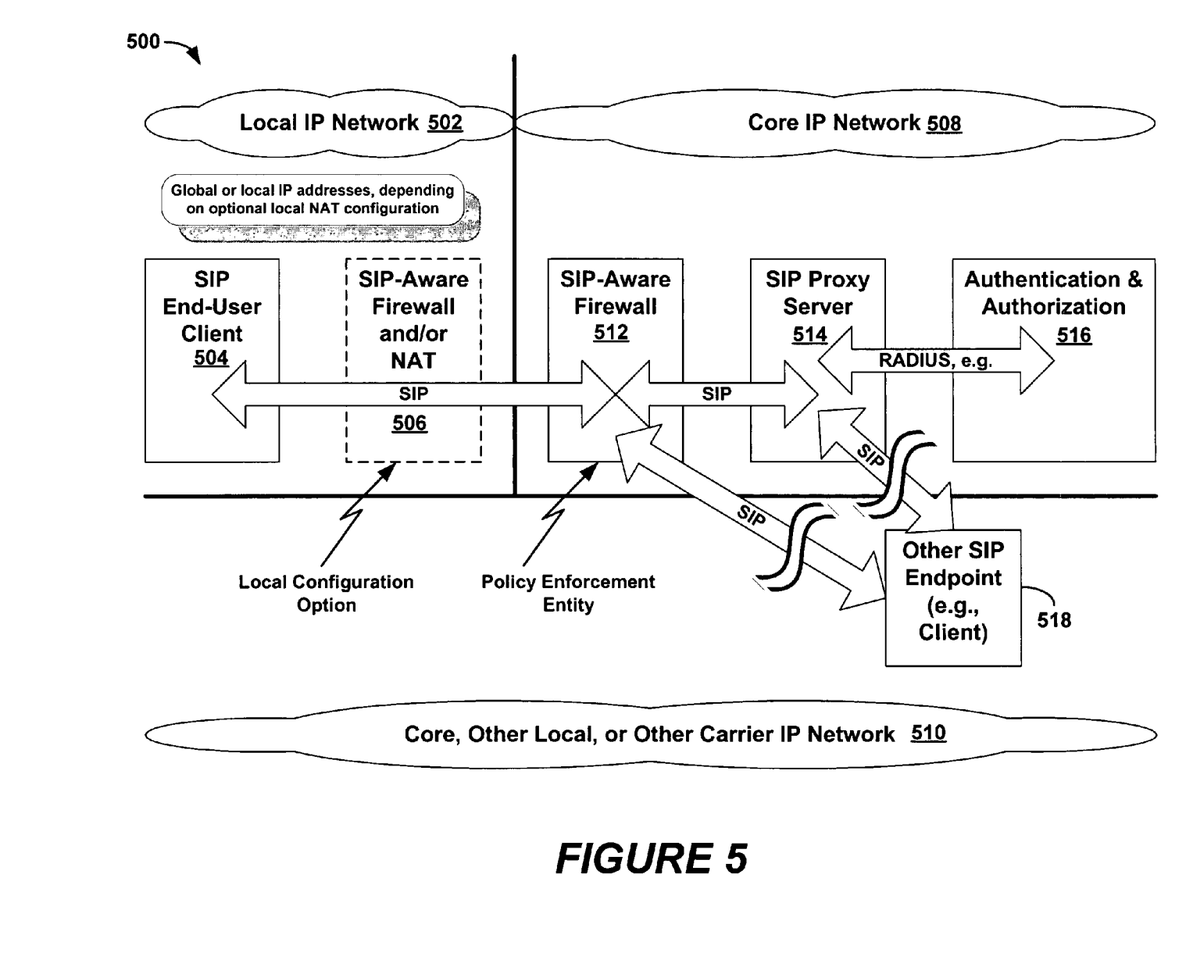
FIG. 5 illustrates one embodiment of a SIP-aware firewall functioning as the network policy enforcement point.
Figure 6:
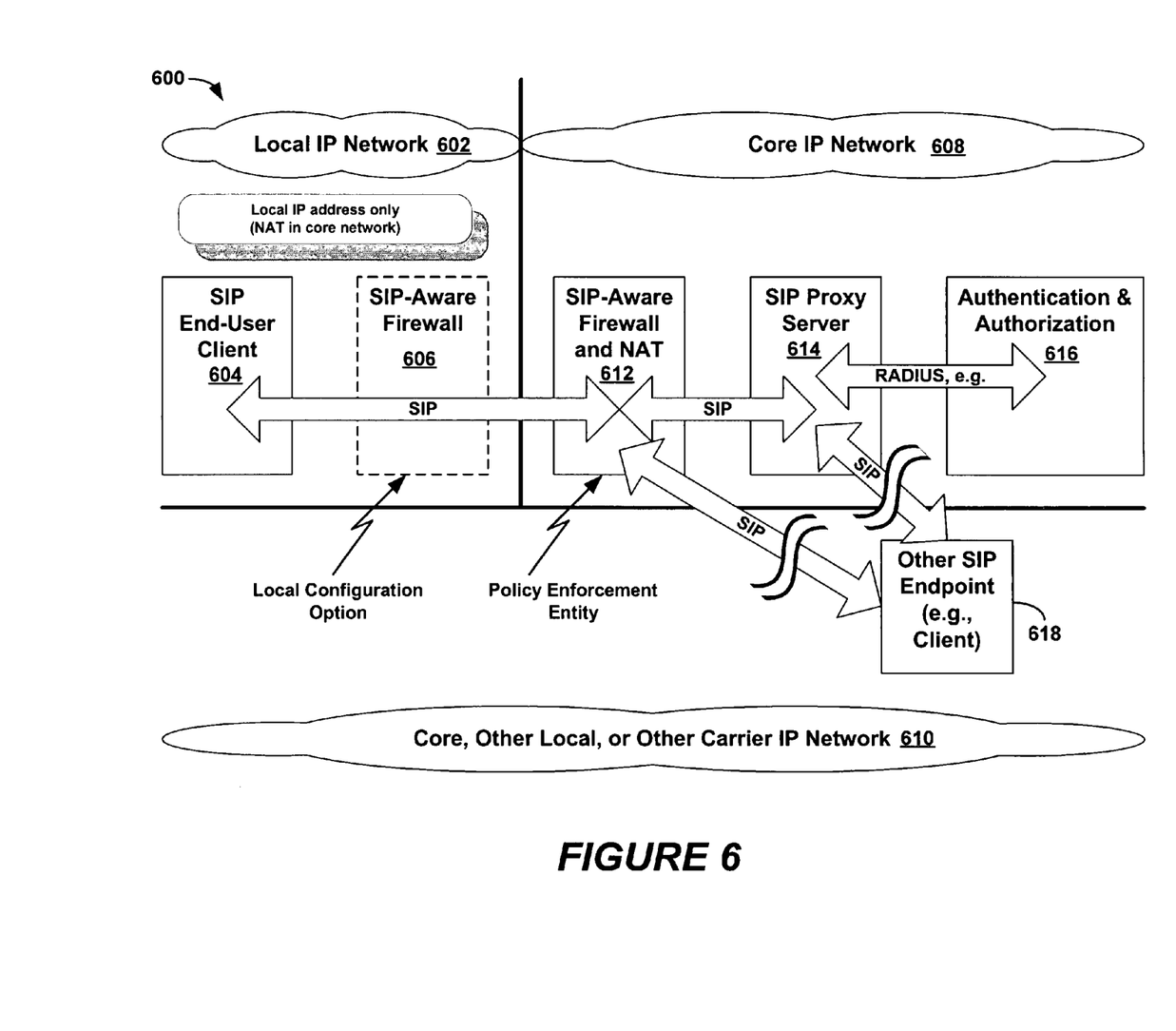
FIG. 6 illustrates one embodiment of a SIP-aware NAT and a firewall functioning as the network policy enforcement point.
Figure 7:
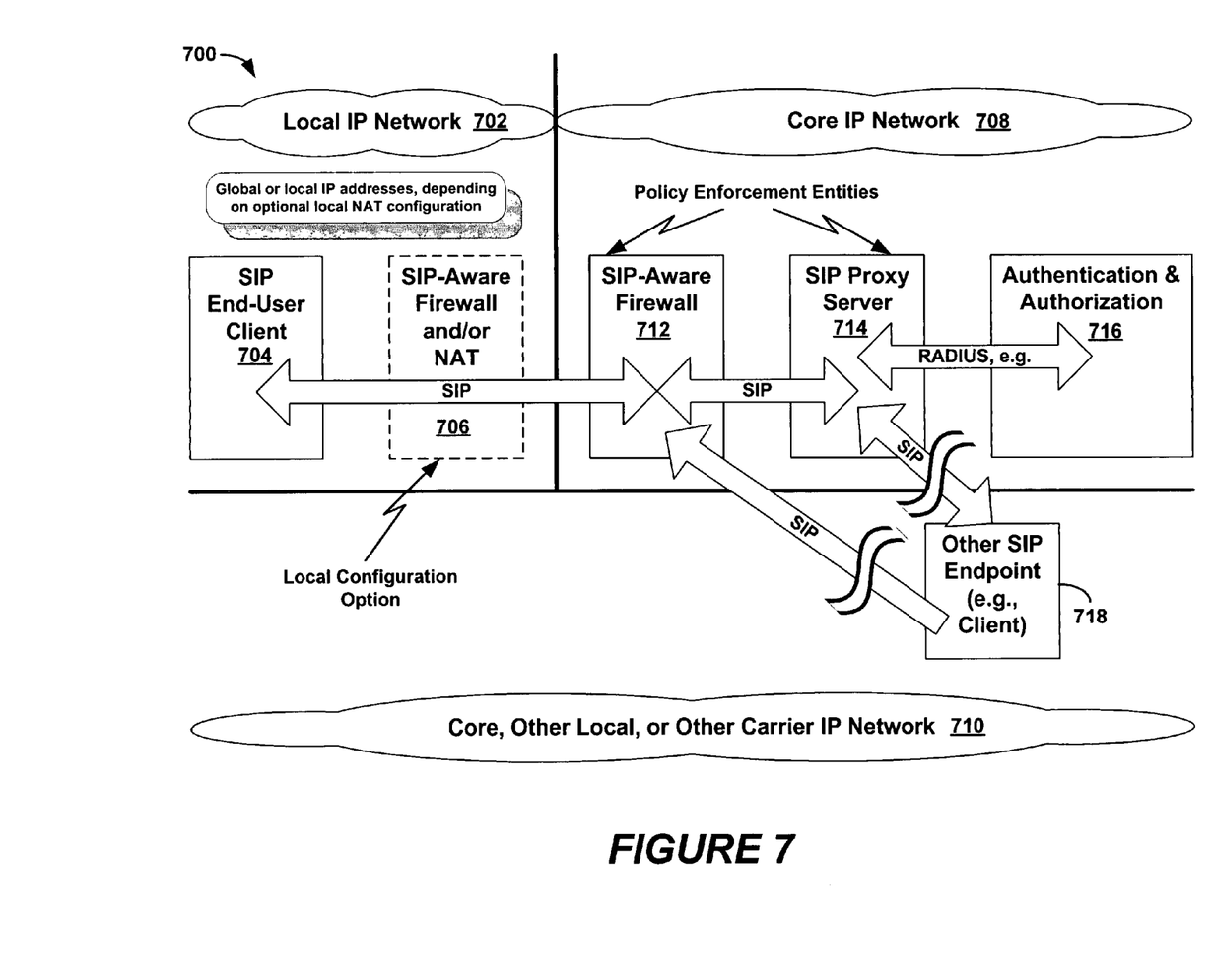
FIG. 7 illustrates one embodiment of a SIP-aware firewall and a SIP Proxy server functioning as the network policy enforcement point.

FIGS. 5-7 illustrate systems that include an entity (or entities) in a core network that is a policy enforcement point(s), and that may carry out the method 300 of FIG. 3. Three exemplary embodiments are illustrated. FIG. 5 illustrates a SIP-aware firewall functioning as the network policy enforcement point. FIG. 6 illustrates a SIP-aware NAT and a firewall functioning as the network policy enforcement point. FIG. 7 illustrates a SIP-aware firewall and a SIP Proxy server functioning as the network policy enforcement point. These configurations for the boundary between local and core networks are intended to be representative, and other combinations are possible.

In the exemplary embodiments, the packet network is an IP network, capable of supporting IP telephony and IP multimedia services and features. In addition, the signaling and call control protocol used in the network is SIP. Further, the end-user clients are SIP phones. It should be understood that these illustrations are not intended to limit the scope of the method and system of the present invention. For example, the signaling and call control protocol could be H.323 instead of, or in addition to, SIP. Also, other SIP end-user devices, in addition to, or instead of, SIP phones, could be used.

The exemplary configurations are described primarily in relation to the filtering of signaling and call control messages, i.e., SIP messages. Each configuration includes a firewall component, which, among other capabilities, is SIP-aware. However, as discussed above, the system and method of the present invention also plays a role in the monitoring and regulation of network media resource usage. In all three exemplary configurations described below, it is assumed that the network performs monitoring and regulation functions of network media usage in the firewall component. That is, on any given call, the determination of the need for network media resources will be made as part of the call control and signaling filtering process, but the monitoring and regulation may be performed by the firewall.

FIG. 5 illustrates a system 500 including a SIP-aware firewall 512 functioning as the network policy enforcement point. The system further includes a local IP network 502, which includes a SIP end-user client 504 and a SIP-aware firewall and/or NAT 506. The local IP network 502 may communicate with a core IP network 508 and other local or other carrier IP network 510. The core IP network 508 includes the SIP-aware firewall 512, a SIP proxy server 514, an authentication and authorization server 516. The other network 510 includes another SIP endpoint 518, illustrating that end-to-end communications may terminate on one client within the local network 502 and another client within the network 510.

The SIP-aware firewall 512 in the core IP network 508 is in the path of all IP communications to and from the local IP network 502, regardless of whether or not the local IP network 502 uses NAT and/or its own firewall 506. No IP packet may pass from the local network 502 to the core IP network 508, or from the core IP network 508 to the local IP network 502, without crossing the SIP-aware firewall 512. SIP endpoints outside the local IP network 502 may communicate with SIP clients inside the local IP network 502 either directly or indirectly through the SIP Proxy server 514. In either case, however, all outside SIP messages to or from internal clients of network 508 traverse the SIP-aware firewall 512.

During the registration process between a SIP phone 504 in the local IP network 502 and the SIP Proxy server 514 in the core IP network 508, user profile information is retrieved by the SIP Proxy server 514 from the authentication and authorization server 516, and can be passed to the SIP-aware firewall 512 for use in the policy enforcement methods. Because the firewall 512 is SIP-aware, the firewall 512 is capable of recognizing SIP messages to and/or from the SIP phones in the local IP network 502. Therefore, the firewall 512 can be a suitable point for filtering SIP messages according to authorized services of end-users of SIP phones in the local IP network 502.

FIG. 6 illustrates a system 600 including a SIP-aware NAT and firewall 612 functioning as the network policy enforcement point. The system 600 includes a local IP network 602 including a SIP end-user client 604 and a SIP-aware firewall 606. The local IP network 602 communicates with a core IP network 608 and other local or carrier IP network 610. The core IP network 608 includes a SIP-aware firewall and NAT 612, a SIP proxy server 614, and an authentication and authorization server 616. The other network 610 includes another SIP endpoint 618, illustrating that end-to-end communications may terminate on one client within the local network 602 and another client within the network 610.

The combined SIP-aware NAT and firewall 612 in the core IP network 608 is in the path of all IP communications to and from the local IP network 602, regardless of whether or not the local IP network 602 uses NAT and/or its own firewall 606. SIP endpoints outside the local 1P network 602 may communicate with SIP clients inside the local IP network 602 either directly or indirectly through the SIP Proxy server 614. In either case, however, all outside SIP messages to or from internal clients of network 608 traverse the SIP-aware NAT/firewall 612.

Similar to the system 500 illustrated in FIG. 5, during the registration process between the SIP end-user client 604 in the local IP network 602 and the SIP Proxy sever 614 in the IP core network 608, user profile information is retrieved by the SIP Proxy server 614 from the authentication and authorization server 616, and can be passed to the combined SIP-aware NAT and firewall 612 for use in the policy enforcement methods.

FIG. 7 illustrates a system 700 with a SIP-aware firewall 712 and a SIP Proxy server 714 functioning as the network policy enforcement point, e.g., core IP network border element. The system includes a local IP network 702 including a SIP end-user client 704 and a SIP-aware firewall and/or NAT 706. The local IP network 702 communicates with the core IP network 708 and other local or carrier IP network 710. The core IP network 708 includes the SIP-aware firewall 712, the SIP proxy server 714, and an authentication and authorization server 716. The other network 710 includes another SIP endpoint 718, illustrating that end-to-end communications may terminate on one client within the local network 702 and another client within network 710.

The SIP-aware firewall 712 in the core IP network 708 is in the path of all IP communications to and from the local IP network 702, regardless of whether or not the local IP network 702 uses NAT and/or its own firewall 706. Because the firewall 712 is SIP-aware, the firewall 712 can ensure that every SIP message outbound from a SIP phone, e.g., SIP end-user client 704, in the local IP network 702 is forwarded through the SIP Proxy server 714. The SIP Proxy server 714 may then apply policy enforcement to these SIP messages as necessary. For SIP messages sent to SIP phones in the local IP network 702, it may not always be possible to ensure traversal of the SIP Proxy server 714. Thus, for SIP messages inbound to SIP phones in the local IP network 702, the firewall 712 may implement the necessary filtering. (Note that inbound messages may traverse the SIP Proxy server 714, but such a path is not always ensured). The different treatment of inbound and outbound messages is indicated in FIG. 7 by the unidirectional arrow from the SIP client 718 to the SIP-aware firewall 712 (i.e., inbound only). As in the systems 500 and 600, the user profile information can be made available to the firewall 712 during the SIP registration process. The SIP Proxy server 714 will have access to this information, as well.

The system 700 illustrates distributed filtering because the implementation of the policy enforcement is distributed between the SIP-aware firewall 712 and the SIP Proxy 714. All outbound SIP messages (i.e., from a subscriber in the local IP network 702 toward the core IP network 708) can be forwarded to the SIP proxy server 714, which then performs the relevant filtering steps. All inbound SIP messages (i.e., from the core IP network 708, or from a client 718 in network 710, to a subscriber in the local IP network 702) can be handled by the SIP-aware firewall 712. This embodiment is advantageous since processing of inbound messages is required and because it may not be possible to guarantee that all inbound messages traverse the SIP Proxy server 714, but it may be possible to guarantee traversal of the SIP-aware firewall 712.

Associating a Signaling and/or Call Control Message with a Service or Feature

In the exemplary embodiment, the network policy enforcement point associates each signaling and/or call control message within a specific protocol to be part of the implementation of a known service or feature. For example, the policy enforcement point may recognize a SIP message to be a step in a call flow for implementing call waiting. Thus, each signaling and/or call control message is matched against an inventory or database of implementations of services and features using the specific signaling and call control protocol.

The database may be included within an authentication and authorization server. The database may include all known possible ways in which, using the specific signaling and call control protocol, services and features may be implemented. This supports a wide range of intelligent end-user client types and/or models in the local network environment, without limitation to the implementations that may be employed for known services. That is, not only does the network permit authorized invocation of intelligent-client-based services and features using the specific protocol, but also the network would not restrict the particular implementations with regard to the signaling and call control sequences. Alternatively, the database may include only the ways in which, using the specific signaling and call control protocol, services and features are implemented within the core IP network. In this regard, for the specific protocol, the database of possible implementations of each service and feature is limited only to those known and used in the network.

The network policy enforcement point may query the database to recognize that a particular signaling and/or call control message of a specific protocol represents all or part of the invocation of a known service or feature. Note that multiple elements of a protocol message may be required to make the determination of the service or feature. For example, a particular message type may indicate different services or features, depending upon other parameters in the message. If the message cannot be identified with a known service or feature, then it could be deemed unauthorized, and discarded according to the filtering rules.

Identification of Sip Messages with Features and Services

In the exemplary embodiment, the signaling and call control messages that are received by the network policy enforcement point will be SIP messages. It is assumed that every SIP message may be recognizable within a known SIP-based service transaction model. An unrecognizable SIP message may simply be discarded. The inventory of known SIP-based service transaction models comprises those versions implemented by the carrier or service provider, plus additional versions viewed as common, or accepted, as determined by published best practices, for example. In certain cases, the contents or format of a SIP message may not carry a specific request for a feature or service, but rather indicate one or more features or services that could be supported by the message. One example of this is caller identification (ID). Note that a complete set of transaction models could cover services and features supported and/or available from the carrier or service provider, as well as possibly services and features supported and/or available only from intelligent clients and third-party service entities.

The following list provides some examples of services and/or features, and how SIP messages might be used to identify or interpret them.

1. Caller ID. The ability to deliver caller ED on a given call can be discerned by examining a SIP INVITE message that was used to initiate the call. The contents of Table 1 are reproduced below to illustrate one example. The caller's identity can be included in a number of ways, any of which would allow caller ID do be delivered on the call. For example, if any of the three fields "from," "p-asserted," or "remote party ID" is set with valid parameters, then caller ID is possible. As shown below, the "from" field indicates that this call was initiated by "Sender."

INVITE sip: user@biloxi.com SIP/2.0
Via: SIP/2.0/UDP pc33.atlanta.com; branch=z9hGbk776asdhds
Max-Forwards: 70
To: User <sip:user@Biloxi.com>
From: Sender <sip:sender@atlanta.com>; tag=1928301774

Call-ID: a84b4c76e66710@pc33.atlanta.com
Cseq: 314159 INVITE
Contact: <sip:sender@pc33.atlanta.com>
Content-Type: application/sdp
Content-Length: 142

2. Call waiting and n-way calling. The ability to deliver the call waiting feature is not associated with specific contents of a SIP message, but rather depends upon authorization of the subscriber to receive a new call setup request (e.g., SIP INVITE) while currently in an active call. Note that network-based call waiting can directly include authorization screening, but intelligent client-based call waiting could potentially bypass the network check. Hence any inbound call while the subscriber is already in an active call is a potential candidate for call waiting. N-way calling is similar to call waiting, except that the new call setups (e.g., SIP INVITEs) are originated by the subscriber who may already be in an active call. Thus, any outbound call made by a subscriber who is already in an active call is potentially part of an n-way call setup. For both call waiting and n-way calling, the network policy enforcement point, e.g., SIP-aware firewall, should have the ability to recognize that a given subscriber is already in an active call.
3. Multi-line service. Multi-line service is similar to call waiting and n-way calling in that it depends upon authorization of the subscriber to have multiple, simultaneous call sessions.
4. Codec specification. Codec specification can be determined by examining the SDP associated with the call setup transaction. This may include the initial SIP INVITE, as well as other messages, which facilitate codec negotiation. Note that mid-call signaling can also be examined since the codec can be re-negotiated during the call.

Determining Authorization for a Service or Feature

Determination of whether or not a particular user is authorized to use or invoke a specific service or feature is based upon information stored by the system and pertaining to the particular user. Such information is typically associated with or maintained in a database of user profiles. Each user profile contains information specific to a particular user. Note that the term "user" in the context of a user profile could represent an individual person, a group, or a generic identity (e.g., "cafeteria phone"). The information in the user profile includes a list of authorized services and features, and possibly ancillary information, such as times or days that authorizations apply, or parameters associated with particular services or features, etc. It should be understood that other types of information, and other storage formats besides lists may be used.

A user profile is generally associated with a subscriber of a carrier or service provider, and stores user-specific information, including the services and features in the profile. However, a user may also invoke a temporary or one-time service. For example, a caller who is a subscriber to carrier "A" may be able to call a subscriber to carrier "B," provided the two carriers have a peering agreement in place. In this case, the user profile in "B" for the caller from "A" may be a temporary or default profile with services limited, e.g., to placing basic calls to subscribers of "B." Thus, a user profile may be a temporary or dynamic data construct applied, for example, to a one-time or limited-time use. In addition to the example of callers from a foreign carrier network, this could apply to a prepaid calling card, or even a single paid call.

Examples of features or services that may be listed as authorized in a user profile include basic calling, caller ID, call waiting, automatic callback, conference calling, and call forwarding. This list of examples is not intended to limit in any way the types of services that may be made available to users through authorization in a user profile, or other network database.

Before any service or feature can be used or invoked, a user should be authenticated and admitted into the system, and the user's authorized services should be identified from the user's profile. This usually requires some sort of a registration process. For a single paid call, for instance, this could be a one-time keypad sequence. For a SIP phone user, this would be a SIP registration process. In any case, some network entity, e.g., SIP proxy server, receives input from the user, and then initiates the process of authentication, authorization, and admittance. This process might be carried out by the network entity that communicates with the user, or by passing the user's information to a network server that maintains the user profile data. Assuming the user is authenticated, the user profile may be retrieved, and the user's authorized services and features identified.

For calls originating in a foreign carrier's network, an explicit registration step might be omitted, and a default profile applied. The profile information would then be passed to the network entity or entities that carry out the actual policy enforcement. In this case, the caller does not necessarily register with a SIP Proxy server in the home network, but nevertheless is governed by some set of authorized features and services. The exact makeup of the set may be provisioned statically in a firewall, according to a peering or service-level agreement between the home and foreign carriers. Other methods for feature and service authorization for non-subscribers may be used as well.

As an example, subscriber services in a SIP-based network require registration of a SIP User Agent with the network. The SIP User Agent representing the subscriber initiates a SIP registration process with a SIP Proxy server in the core network. For example, the SIP end-user client 704 registers with the SIP proxy server 714 in the core IP network 708. During this process, the SIP Proxy server 714 will query the authentication and authorization server 716 to verify authenticity of the user, and discover what features and services the user is authorized to invoke. The SIP proxy server 714 may use RADIUS for communications to the authentication and authorization server 716. Note that multiple transactions may be involved, both between the SIP Proxy server 714 and the user 704, and between the SIP Proxy server 714 and the authentication and authorization server 716.

Assuming successful registration, the SIP Proxy server 714 will know what features and services the user may invoke. This information may be in the user's profile and may include a list, as well as parameters relating to service levels (e.g., quality, priorities, bandwidth and other resource allocation levels, etc.), and account balances (e.g., remaining prepaid minutes, etc.). Other feature and service descriptors and/or parameters may also be included.

The user's profile information is then made available to the policy enforcement entity (or entities). One method for transferring this information is to use SIP to communicate policy information from the SIP Proxy server 714 to the SIP-aware firewall 712. In this regard, the SIP-aware firewall 712 may include a SIP User Agent application for terminating SIP-based communications with the SIP Proxy server 714, and extensions and/or enhancements may be added to SIP that support carriage of the requisite information. Examples of extension and/or enhancements that may be added to SIP to perform this function are described in U.S. patent application Ser. No. 10/243,642, filed on Sep. 10, 2002 and entitled "Architecture and Method for Controlling Features and Services in Packet-Based Networks."

Note that other protocols could be used to transfer authorization information to the SIP-aware firewall 712. For example, a remote control protocol, such as MGCP or MEGACO protocol, could be used to transfer the information, and even instruct the firewall 712 how to behave. In this case, the SIP Proxy server 714 would function in conjunction with a control element that communicates with the firewall 712. This is only a partial list of possible methods for communication between the SIP Proxy server 714 and the SIP-aware firewall 712.

Once the service or feature associated with a given signaling or call control message is identified (as explained above), the service or feature is checked against the authorized services and features for the sender and/or the intended recipient of the message. The choice of sender or intended recipient is based upon which is a recognized user, in combination with the specific service. That is, whether the specific type of service or feature is designed for delivery to the sender and/or intended recipient of the message, and whether the sender and/or intended recipient is authorized for that service. For example, if the feature or service is to be delivered to the user who sent the message, then this user should be authorized. If the feature or service is to be delivered to the user who is the intended recipient of the message, then this user should be authorized. If the feature or service is to be delivered to both sender and intended recipient of the message, then both should be authorized to invoke the service. Once the party to whom the feature or service is to be delivered is identified, then authorization for the service or feature can be made by checking against the authorizations discovered during authentication and authorization, e.g., SIP Proxy registration. Based on the outcome of this step, the system either allows or denies the forwarding of the message. As noted, the specific actions that apply to either decision constitute the filtering rules and actions (described more fully below).

Note that some of the implementations for services or features may be hosted in the network. Any such features that are invoked by, or on behalf of, a subscriber using the network implementation can automatically be subject to an authorization check. That is, if the service or feature is being requested from the network itself, then the network has the guaranteed opportunity to check for authorization prior to delivering the service or feature. However, for any service or feature that can be implemented in an intelligent end-user client, the check provided nevertheless allows the network to verify authorization prior to allowing the signaling and call control messages to travel any further.

The determination as to whether the feature or service is to be delivered to the sender, intended recipient, or both, depends upon the specific feature or service. The following list provides some examples.

1. Caller ID. Caller ID is a feature that is delivered to the intended recipient of a SIP INVITE. Therefore, if any of the fields in the SIP INVITE indicate that caller ID could be delivered, the authorization check should be made for the intended recipient.
2. Call waiting and n-way calling. Call waiting is a feature that is delivered to the intended recipient. Therefore, if an inbound (e.g., from the core network to a subscriber in a local network) SIP INVITE is received while the intended recipient is already in an active call, then the intended recipient should be authorized to receive a second call session initiation to invoke this service. N-way calling is initiated by the sender of the message. Therefore, if an outbound (e.g., toward the core network from a subscriber in a local network) SIP INVITE is received while the sender is already in an active call, then the sender should be authorized to have multiple (up to n) simultaneous sessions to invoke this service.
3. Multi-line service. Multi-line service applies to both inbound and outbound calling of the subscriber. Therefore, if a subscriber sends an outbound SIP INVITE, or is the intended recipient of an inbound SIP INVITE, while already in an active call, then that subscriber should be authorized to have multiple call sessions in order to be allowed to invoke this service.
4. Codec specification. Codec specification can be checked against authorizations of the sender and/or intended recipient. If either is a subscriber, then the authorizations will have been discovered during SIP registration. If either is a foreign user, then authorizations may be pre-configured or provisioned.

Filtering Rules and Actions

Once the decision to allow or deny forwarding of the signaling/call control message is made, a filtering action may be performed resulting in one of the following:

1. Forwarding the message on, unaltered, to the next hop in the path to the intended recipient.
2. Forwarding the message on, with alterations, to the next hop in the path to the intended recipient. The alterations will depend upon the message type and the policy in place for the sender and/or intended recipient.
3. Discarding the message and returning an error indication message to the sender.
4. Discarding the message and returning no indication of that action, or any other error indication, to the sender.
5. Discarding or holding the message and returning an option message to the sender.

The first possible action of forwarding the message on, unaltered, applies to the case of a fully allowed message, i.e., one that is unconditionally cleared. For example, if the message is intended for a user that is authorized to invoke the service, then the message may be forwarded to this user.

The second possible action of altering the message and then forwarding the message on, applies to the case of a conditionally allowed message. For example, this applies to a message in which removal or alteration of a parameter restrains the scope of a requested service or feature within allowable or authorized limits. Alternatively, the alteration may disable an unauthorized service, while maintaining a required message in an authorized call flow. Other uses of this action may be possible.

The third possible action of discarding the message and returning an error message applies to the case of an unauthorized service or feature, in which the sender should receive an error notification. For example, this applies if the signaling or call control protocol specifically requires an error message in the case of failure to deliver the message. An error message may also be returned if the sender is a trusted network element, and the error message aids or improves network performance. Other uses of this action may be possible as well.

The fourth possible action of discarding the message and returning no indication of that action applies to the case of an unauthorized service or feature, in which the sender should not receive an error notification. For example, if the signaling or call control protocol may specifically forbid an error message in the case of failure to deliver the message. Such an approach may be taken to help ward off denial-of-service attacks, for instance.

The fifth possible action of discarding or holding the message and returning an option message to the sender applies to the case of an unauthorized service or feature, in which the network may choose to offer to the sender. For example, the sender may be attempting to initiate a 3-way calling feature, but the sender may not be authorized to use this feature. The network, or elements in the network such as SIP-aware firewall 712 or other policy enforcement point, may send an option message to the sender asking the sender if he/she would like to utilize this service for the present call. The policy enforcement point may then grant the unauthorized sender use of the feature for the present call. Depending on any service agreements between the sender and the network, the sender may be charged an additional fee for this feature, for example.

Other filtering actions may be performed as well depending on the service or feature requested and/or based on a user's authorization privileges. For example, after receiving notification of a user's authorized services, the network policy enforcement point could query additional databases in the event that a user has multiple user profiles to determine whether to allow or deny usage of a requested service. Other examples are possible as well.

The filtering action performed depends on the application of the filtering rules to the outcome of the authorization check. For example, the actions taken depend upon the specific feature or service, and whether or not it is allowed. In the case of a denial, the actions performed may also depend upon any protocol requirements imposed by SIP as to how to handle discarded messages. Specifically, whether the error response to the particular SIP method calls for silent discarding, discarding with an error indication back to the sender, or possibly offering the feature for use by the sender for the present call. The sample features and services listed above serve as examples below.

1. Caller ID. If a SIP INVITE is identified as capable of delivering caller identity information, and the intended recipient is authorized for caller ID, then the SIP INVITE is forwarded unaltered to the intended recipient. This is the first of the possible filtering actions. If a SIP INVITE is identified as capable of delivering caller identity information, and the intended recipient is not authorized for caller ID, then the caller identity information is removed from the SIP INVITE before it is forwarded to the intended recipient. This is the second of the possible filtering actions, and it effectively disables caller ID while permitting the call setup to proceed.

2. Call waiting and n-way calling. If a SIP INVITE is identified as destined to a subscriber who is already in a call, and the subscriber is authorized to receive a second call setup initiation, then the SIP INVITE is forwarded unaltered to the intended recipient (the subscriber). This is the first of the possible filtering actions. If a SIP INVITE is identified as destined to a subscriber who is already in a call, and the subscriber is not authorized to receive a second call setup initiation, then the SIP INVITE is not forwarded to the intended recipient (the subscriber), and a busy indication is returned to the sender. This is the third of the possible filtering actions.

For n-way calling, if a SIP INVITE is identified as sent from a subscriber who is already in a call, and the subscriber is authorized to have multiple sessions, then the SIP INVITE is forwarded unaltered. This is the first of the possible filtering actions. If a SIP INVITE is identified as sent from a subscriber who is already in a call, and the subscriber is not authorized to have multiple call sessions, then the SIP INVITE is not forwarded, and an error indication is returned to the sender. This is the third of the possible filtering actions. Alternatively, according to the fifth possible filtering action, a SIP INVITE message may be sent back to the unauthorized subscriber asking the subscriber whether he/she would like to utilize n-way calling for the present call. If so, the unauthorized subscriber may return the SIP INVITE message and the SIP INVITE message may then be forwarded unaltered.

3. Multi-line service. If a SIP INVITE is identified as destined to a subscriber who is already in a call, or if a SIP INVITE is identified as sent from a subscriber who is already in a call, and the subscriber is authorized to have multiple, simultaneous call sessions, then the SIP INVITE is forwarded unaltered. If either of these feature/service identifications is made, and the subscriber is not authorized to have multiple, simultaneous call sessions, then the SIP INVITE is not forwarded, and an error notification is returned to the sender. In the case of an inbound call, the notification may be a busy indication, for example.

4. Codec specification. If a subscriber attempts to negotiate a codec for which the subscriber is not authorized, then the SIP message or messages that facilitate the negotiation may be altered to specify a codec that is authorized. Alternatively, the SIP transaction(s) that attempts the unauthorized codec negotiation may be disabled by the filtering actions. In this case, presence or absence of error notification may be determined on the basis of local policy.

Once a successful negotiation is complete, the media monitoring and regulation component(s) of the SIP-aware firewall are notified as to the selected codec. This information may be used, e.g., to set a bandwidth allocation for the call to prevent the unauthorized substitution of a different codec that might consume more bandwidth.

Media Resource Monitoring and Regulation

If a given service or feature consumes or uses any network media resources, then the size or amount may be subject to negotiation or network assignment during call control and/or signaling of the service or feature. For example, a basic call consumes network media bandwidth. The amount allocated by the network may be assigned based upon preset values in a user profile, or dynamically negotiated in a real-time network-user interaction. In such cases, there may be network entities that actively monitor and/or regulate resource usage to ensure compliance with the negotiated or assigned level.

While policing resource usage may already be carried out as part of the function of a network entity, such as a border element, the system and method of the present invention still assists in the process by providing information required to carry out the monitoring and/or regulation. For instance, by observing the codec negotiated between endpoints for a given call, the requisite bandwidth can be determined. This value, in turn, can be supplied to the appropriate border element in the call's path, and used to ensure that the media traffic of the call remains within the negotiated limits.

In one embodiment, a firewall in an IP network may already provide bandwidth-limiting functions based upon RTP streams, and require as input only information regarding a bandwidth value and an RTP stream identity. Alternatively, a network border element might implement a control protocol that allows remote instructions to be received.

In one example, during the call control and signaling phase, the network policy enforcement entity can determine: (i) which call, session, service, or feature will utilize network media resources; and (ii) the expected level, size, or amount of network media resources required. As another example, during network support of the call or session, or delivery of the feature or service, the network policy enforcement entity can ensure that the actual consumption or usage of network media resources remains with the expected limits.

As noted, the need for the network policy enforcement entity to perform the actions and tasks associated with monitoring and regulation is determined on a call-by-call basis (where "call" refers to any of: call, session, feature, or service). The actions and tasks apply to those calls, session, features, or services which consume network media resources.

One example of monitoring and regulation of media is based on methods of handling RTP traffic. The network policy enforcement entity, e.g., firewall, may include such capabilities as collecting RTP statistics, opening and closing RTP pinholes, and imposing control over RTP streams based upon a combination of external commands and internal logic that compares actual and expected usage.

The sample features and services listed above serve as additional examples explained below.

1. Caller ID. Caller ID does not utilize any network media resources, so there are no associated resource monitoring or regulation tasks.
2. Call waiting and n-way calling. Call waiting and n-way calling can be subject to policy enforcement without involving network resource monitoring and regulation. This can be done by maintaining sufficient call state information to determine if a particular subscriber is in an active call when a new SIP INVITE is issued or received, then allowing or denying any relevant call signaling based upon the call state. Alternatively, discovery of whether or not a particular subscriber is in an active call could be determined by querying the media elements, e.g., to determine if there are active RTP ports associated with a particular subscriber. Similarly, the policy enforcement could be realized by informing and/or instructing the media regulation components as to the permissibility of opening multiple RTP sessions for a particular subscriber.
3. Multi-line service. The comments for call waiting and n-way calling apply for multi-line service, as well.
4. Codec specification. Policy enforcement in the context of codec specification amounts to ensuring that the actual bandwidth consumed by a session does not exceed that expected on the basis of the codec selected during codec negotiation. This can be achieved by informing the network resource monitoring and regulation entity (e.g., the SIP-aware firewall) of the codec selection and/or the associated bandwidth consumption expected. Unauthorized substitution of a higher bandwidth codec can then be prevented by regulating the bandwidth usage on the call session. The corresponding information determined is then passed to the network policy enforcement entity, e.g., SIP-aware firewall, so that the entity may ensure that the agreed-to usage levels are not exceeded.

While exemplary embodiments have been described, persons of skill in the art will appreciate that variations may be made without departure from the scope and spirit of the invention. The true scope and spirit of the invention is defined by the appended claims, which may be interpreted in light of the foregoing.

What is claimed is:

1. A method for controlling a plurality of services in packet-based networks, the method comprising:
   a network entity intercepting a signaling message associated with a call between a sender device of the message and an intended recipient device of the message, wherein the signaling message includes an indication of one type of the plurality of services which the signaling message is intended to invoke;
   the network entity making a determination of whether either the sender device or the intended recipient device is authorized to invoke the type of service indicated in the signaling message based in part on a device profile maintained in part on a remote enforcement point, wherein the type of service comprises at least one of caller-ID, call waiting, multi-way calling, multi-line service, and codec specification; and
   the network entity filtering the signaling message based on the determination such that the signaling message is transmitted to the intended recipient device if either the sender device or the intended recipient device is authorized to invoke the type of service indicated in the signaling message.

2. The method of claim 1, wherein filtering the signaling message comprises altering the signaling message based on the authorized services of the sender device or the intended recipient device.

3. The method of claim 2, wherein altering the signaling message comprises modifying the signaling message so that the indication of the type of service is within authorized limits.

4. The method of claim 1, wherein filtering the signaling message comprises discarding the signaling message having an indication of services which the sender device or the intended recipient devices is unauthorized to use.

5. The method of claim 1, further comprising the network entity communicating with one or more other network entities responsible for monitoring media data flow associated with the call between the sender device and the intended recipient device to ensure compliance with the authorized services and an authorized amount of bandwidth.

6. A method for controlling a plurality of services in packet-based networks, the method comprising:
   a network entity intercepting a message associated with a call between a sender of the message and an intended recipient of the message;
   the network entity recognizing that the message includes at least part of an indication of at least one of the plurality of services;
   the network entity determining whether any beneficiary of the at least one of the plurality of services is authorized to invoke or receive the at least one of the plurality of services based on a beneficiary profile stored in part on a remote enforcement point, wherein the plurality of services comprise at least two of caller-ID, call waiting, multi-way calling, multi-line service, and codec specification; and
   the network entity processing the message based on whether the beneficiary of the at least one of the plurality of services is authorized to invoke or receive the at least one of the plurality of services.

7. The method of claim 6, wherein recognizing that the message includes at least part of the indication of the at least one of the plurality of services comprises:
   accessing a database including information indicating implementations of services; and
   comparing the indication of the at least one of the plurality of services to the information in the database.

8. The method of claim 6, wherein the beneficiary is the sender of the message.

9. The method of claim 6, wherein the beneficiary is the intended recipient of the message.

10. The method of claim 6, wherein determining whether the beneficiary of the service is authorized to invoke or receive the at least one of the plurality of services comprises:

receiving from an authentication server a user profile of the beneficiary that specifies which of the plurality of services the beneficiary is authorized to invoke or receive; and comparing the authorized services for the beneficiary to the at least one of the plurality of services indicated in the message.

11. The method of claim 6, further comprising monitoring network resource usage to ensure that the user is only utilizing services that the user is authorized to use and is utilizing an authorized amount of bandwidth.

12. The method of claim 6, wherein processing the message comprises forwarding the message to the beneficiary if the beneficiary is authorized to invoke or receive the at least one of the plurality of services.

13. The method of claim 6, wherein processing the message comprises altering the message and then forwarding the message to the intended recipient.

14. The method of claim 13, wherein altering the message comprises altering the message so as to disable the at least one of the plurality of services.

15. The method of claim 6, wherein processing the message comprises discarding the message if the beneficiary is not authorized to invoke or receive the at least one of the plurality of services.

16. The method of claim 15, further comprising the network entity returning an error indication message to the sender of the message.

17. The method of claim 6, wherein if the beneficiary is not authorized to invoke or receive the at least one of the plurality of services, processing the message comprises:

returning an option message to the sender asking the sender if the sender wants to invoke or receive the at least one of the plurality of services.

18. A method for controlling a plurality of services in packet-based networks, the method comprising:

a network entity intercepting a message associated with establishing an Internet Protocol (IP) telephony call between a sender of the message and an intended recipient of the message, the message configured according to a protocol;

the network entity requesting a user profile of a user associated with the message, wherein the user profile specifies which of a plurality of services the user is authorized to use, including IP telephony services;

the network entity determining from the user profile whether the user is authorized to invoke or receive the IP telephone services, wherein the IP telephone services comprise at least two of caller-ID, call waiting, multi-way calling, multi-line service, and codec specification; and the network entity filtering the message based on whether the user is authorized to invoke or receive the IP telephone services.

19. The method of claim 18, wherein the user is the sender of the message.

20. The method of claim 18, wherein the user is the intended recipient of the message.

21. The method of claim 18, wherein the message is a session initiation protocol (SIP) message.

22. The method of claim 18, further comprising monitoring network resource usage to ensure that the user is only utilizing services that the user is authorized to use and is utilizing an authorized amount of bandwidth.

23. A system for controlling a plurality of services in packet-based networks, the system comprising:

an interface that is in a communications path of signaling messages between a first end device and a second end device, wherein the interface receives messages according to a protocol;

a processor;

data storage; and program logic stored in the data storage and executable by the processor to intercept at least one message associated with a call between the first end device and the second end device, to associate the at least one message with at least one known service of a plurality of services that are defined within the protocol, to determine whether either of the first end device and the second end device is authorized to invoke or receive the at least one known service of the plurality of services according to a user profile maintained on a remote enforcement point, wherein the type of service comprises at least one of caller-ID, call waiting, multi-way calling, multi-line service, and codec specification, and to filter the at least one message based on whether at least one of the first end device and the second end device is authorized to invoke or receive the at least one known service of the plurality of services.

24. A system comprising:

a border element being in a communications path of session initiation protocol (SIP) signaling messages associated with a call between end devices, wherein the SIP signaling messages include an indication of at least one service of a plurality of services, and wherein the border element is to filter the SIP signaling messages based on authorized services of either of the end devices, wherein an SIP signaling message is transmitted if either of the end devices associated with that SIP signaling message is authorized for a service indicated in that SIP signaling message, wherein the service comprises at least one of caller-ID, call waiting, multi-way calling, multi-line service, and codec specification; and a proxy server for receiving a request from the border element for a user profile of at least one of the end devices the user profile maintained on a storage device, and in response, for sending the user profile to the border element, wherein the user profile specifies which services of the plurality of services the at least one of the end devices is authorized to use.

25. The system of claim 24, wherein the border element is selected from the group consisting of a firewall, an application layer gateway (ALG), and a SIP-aware firewall.

\* \* \* \* \*